(12) United States Patent
Sasaki

(10) Patent No.: US 11,981,036 B2
(45) Date of Patent: May 14, 2024

(54) ROBOT AND CONTROL SYSTEM

(71) Applicant: Fumihiro Sasaki, Kanagawa (JP)

(72) Inventor: Fumihiro Sasaki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 193 days.

(21) Appl. No.: 17/434,760

(22) PCT Filed: Feb. 28, 2020

(86) PCT No.: PCT/JP2020/008538
§ 371 (c)(1),
(2) Date: Aug. 30, 2021

(87) PCT Pub. No.: WO2020/189230
PCT Pub. Date: Sep. 24, 2020

(65) Prior Publication Data
US 2022/0161437 A1 May 26, 2022

(30) Foreign Application Priority Data
Mar. 20, 2019 (JP) ................ 2019-053390

(51) Int. Cl.
*B25J 9/16* (2006.01)
*B25J 19/02* (2006.01)
*G05D 1/222* (2024.01)

(52) U.S. Cl.
CPC .......... *B25J 9/1689* (2013.01); *B25J 9/1697* (2013.01); *B25J 19/023* (2013.01)

(58) Field of Classification Search
CPC ...... B25J 9/1689; B25J 9/1697; B25J 19/023; G05D 1/0038; G05D 2201/0211;
(Continued)

(56) References Cited

U.S. PATENT DOCUMENTS 10,322,507 B2 * 6/2019 Meier .................. G05B 13/027
10,908,615 B2 * 2/2021 Nishimura ........... G05D 1/0088
(Continued)

FOREIGN PATENT DOCUMENTS

CN 1945351 A 4/2007
CN 107223200 A 9/2017
(Continued)

OTHER PUBLICATIONS

International Search Report dated May 15, 2020 in PCT/JP2020/008538 filed Feb. 28, 2020, 13 pages.
(Continued)

*Primary Examiner* — Robert T Nguyen
(74) *Attorney, Agent, or Firm* — XSENSUS LLP

(57) ABSTRACT

A robot is configured to move in accordance with an operation instruction made by an operator via a network. The robot includes a moving image acquisition unit, a receiving unit, a movement destination predicting unit, and an autonomous control unit. The moving image acquisition unit is configured to capture, as a moving image, an environment around the robot. The receiving unit is configured to receive the operation instruction. The movement destination predicting unit is configured to predict a movement destination of the robot based on the operation instruction received by the receiving unit. The autonomous control unit is configured to autonomously correct movement to the movement destination in accordance with the operation instruction, based on information on the environment obtained from a moving image at an instant when the operation instruction is received.

8 Claims, 6 Drawing Sheets

(58) Field of Classification Search
CPC .......... G05D 1/222; G05B 2219/40146; G05B 2219/40151
See application file for complete search history.

(56) References Cited

U.S. PATENT DOCUMENTS

| | | | |
|---|---|---|---|
| 11,256,261 B1* | 2/2022 | Bai | ........................ G05D 1/0246 |
| 2001/0037163 A1 | 11/2001 | Allard | |
| 2007/0276641 A1 | 11/2007 | Sawasaki | |
| 2011/0087371 A1 | 4/2011 | Sandberg et al. | |
| 2012/0197464 A1* | 8/2012 | Wang | ..................... B25J 9/1664 |
| | | | 701/28 |
| 2015/0120046 A1 | 4/2015 | Summer et al. | |
| 2017/0023944 A1* | 1/2017 | Wang | ................... G05D 1/0261 |
| 2018/0099409 A1 | 4/2018 | Meier et al. | |
| 2019/0294172 A1 | 9/2019 | Liu et al. | |
| 2021/0001487 A1* | 1/2021 | Ohtsuka | ............... G05D 1/0246 |
| 2022/0244726 A1* | 8/2022 | Shigeta | .................. H04N 7/185 |

FOREIGN PATENT DOCUMENTS

| | | |
|---|---|---|
| EP | 2865495 | 4/2015 |
| JP | 5503052 | 5/2014 |
| JP | 2017-102705 | 6/2017 |
| JP | 2018-147158 | 9/2018 |
| WO | 2009/091536 | 7/2009 |
| WO | 2009/091536 A1 | 7/2009 |

OTHER PUBLICATIONS

Office Action dated Jun. 24, 2022 in Chinese Patent Application No. 202080021935.1, 19 pages.

* cited by examiner

[Fig. 1]
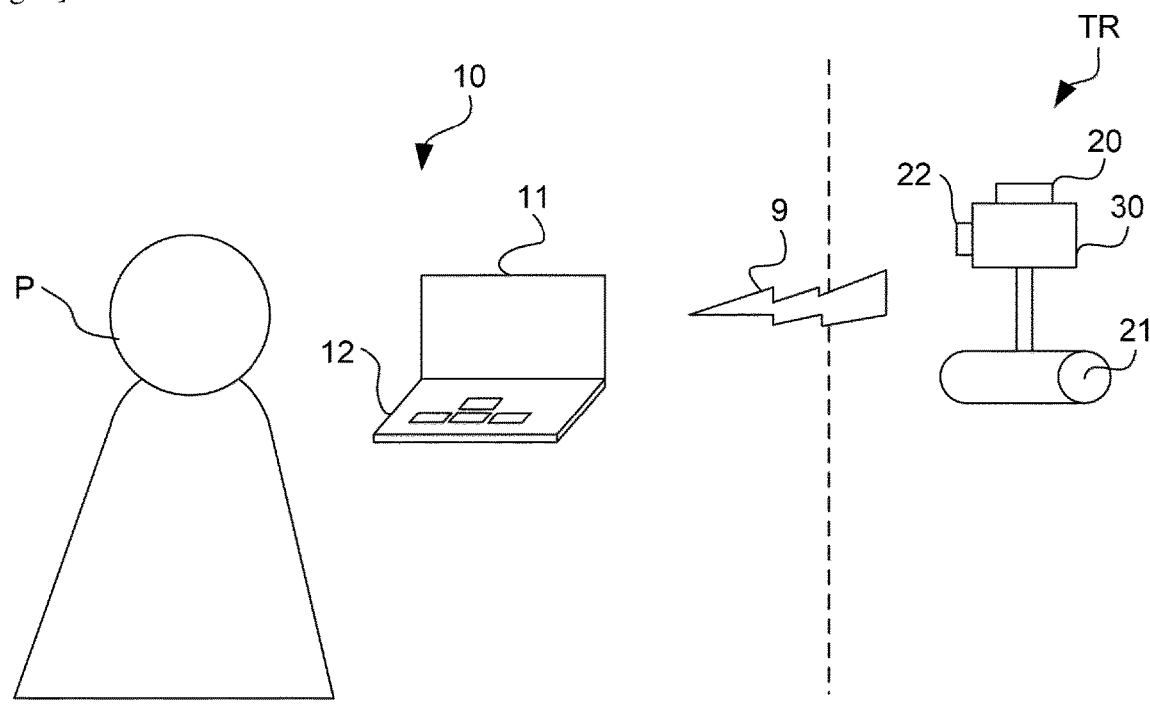
[Fig. 2]
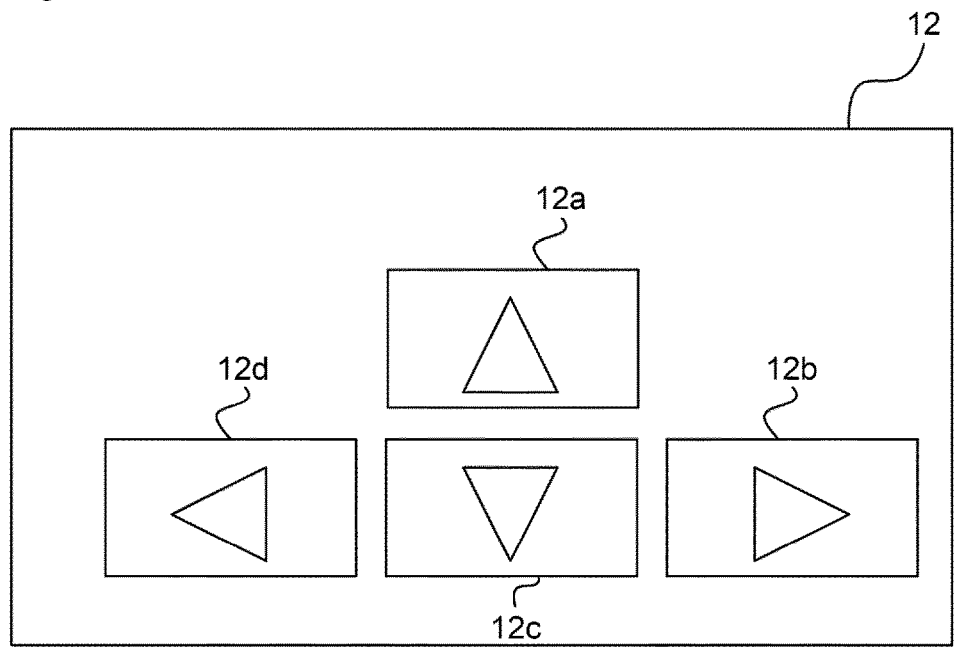

[Fig. 3]
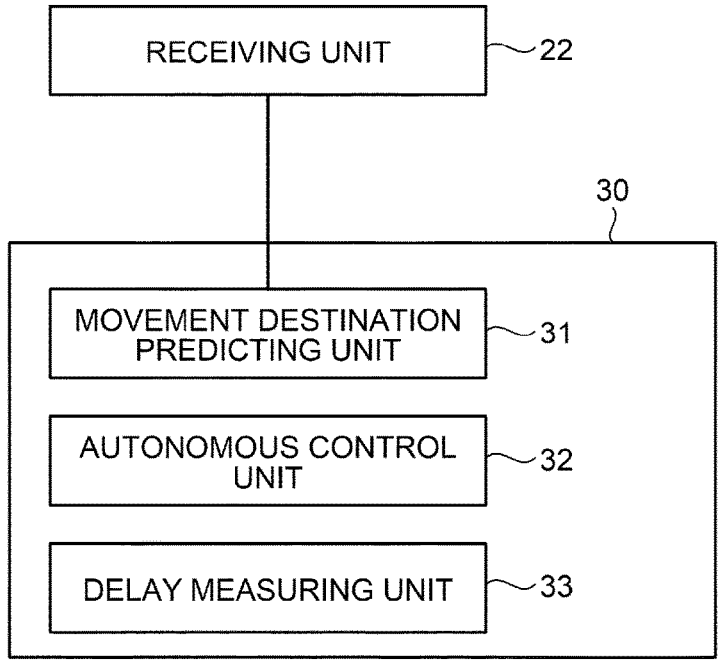
[Fig. 4]
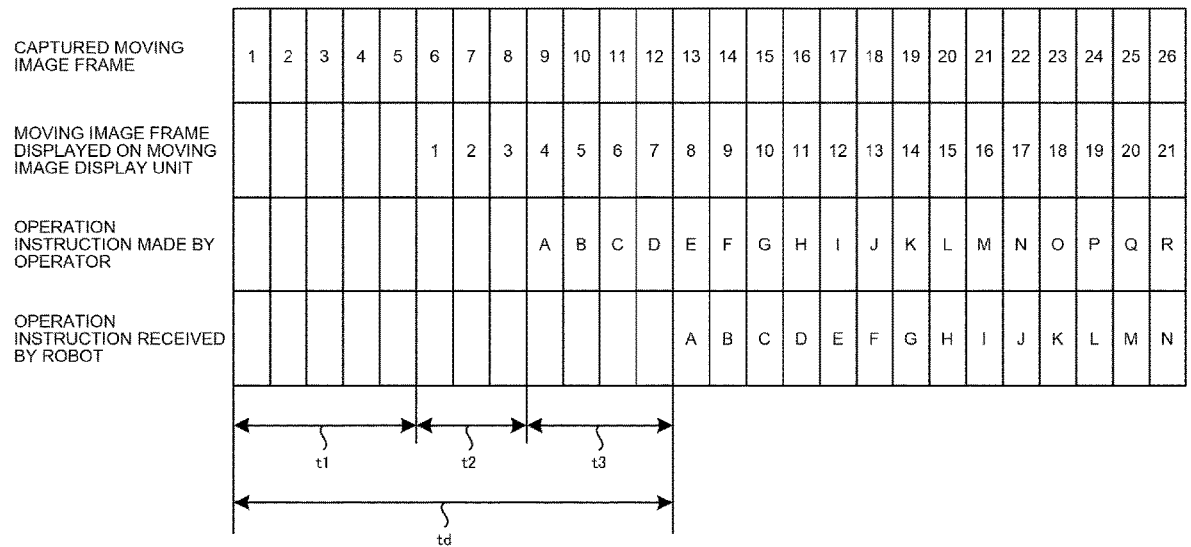

[Fig. 5]
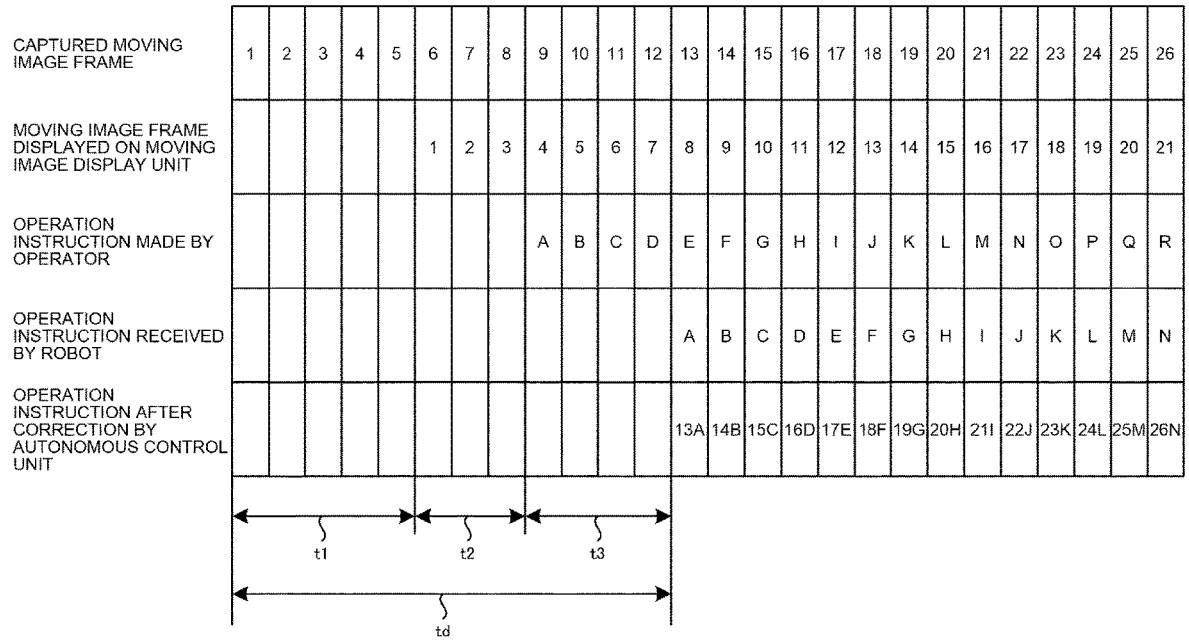
[Fig. 6]
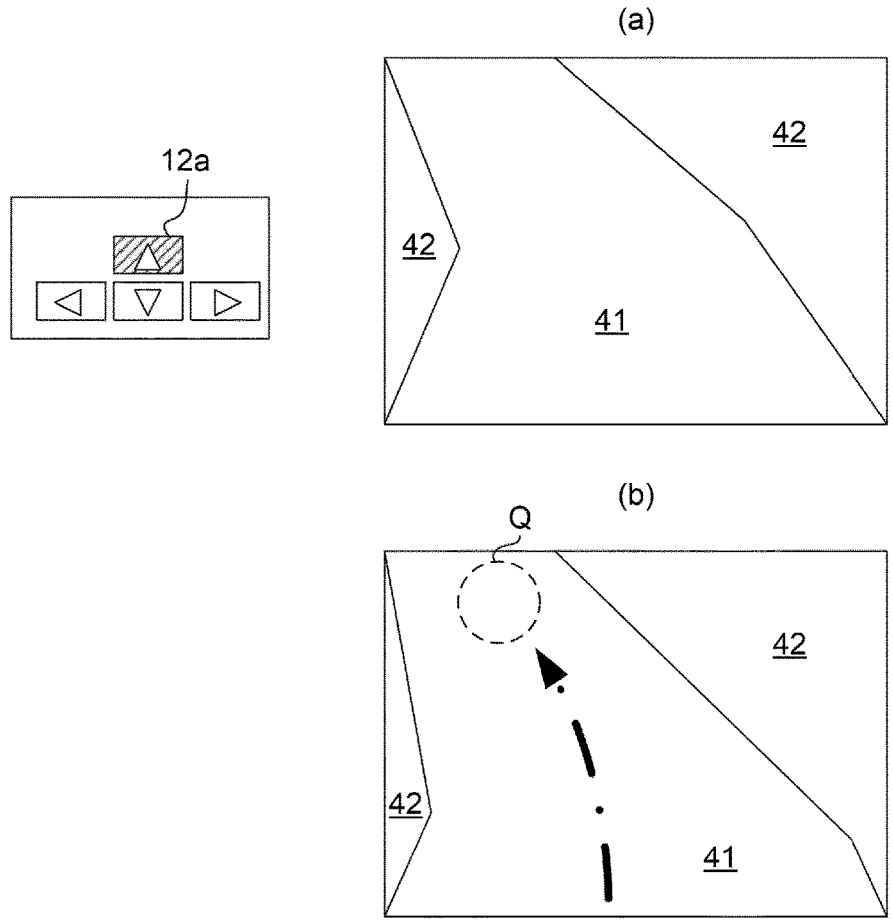

[Fig. 7]
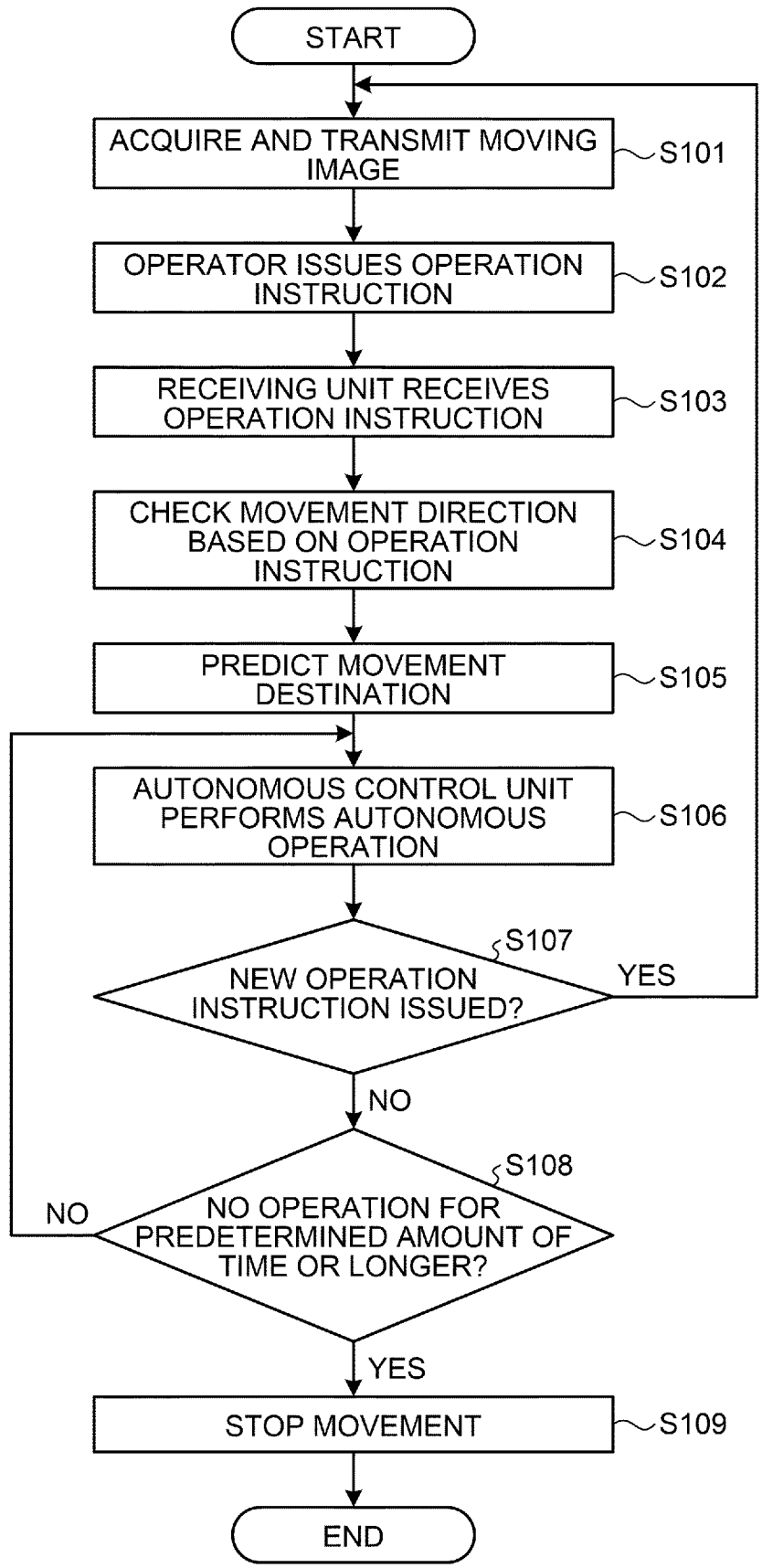

[Fig. 8]
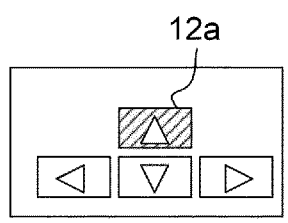 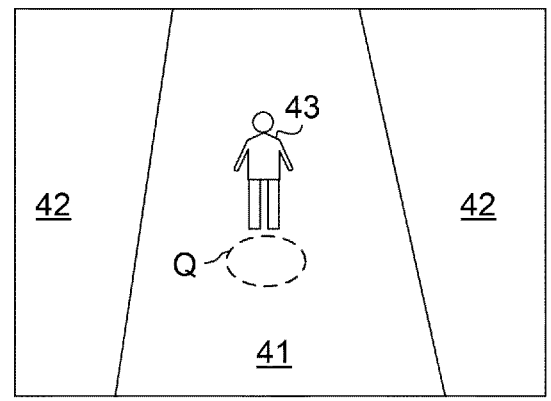
[Fig. 9]
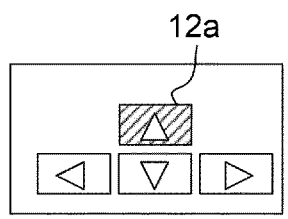 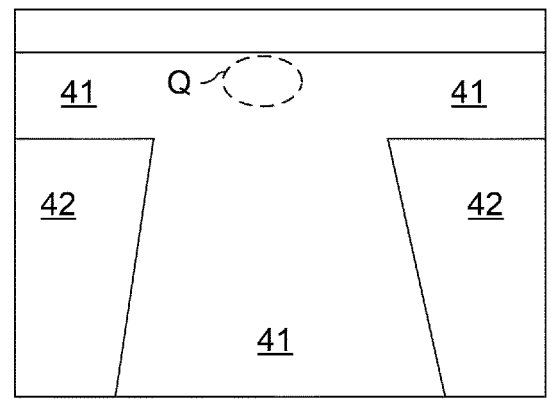

[Fig. 10]
(a)
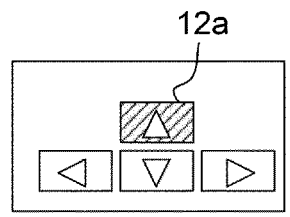
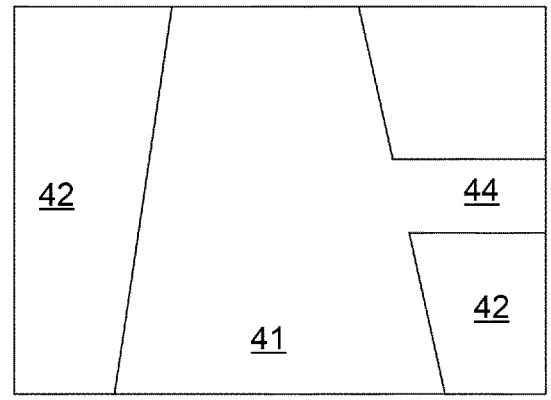
(b)
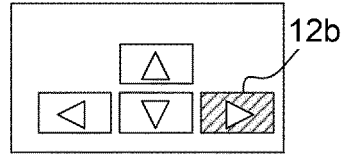
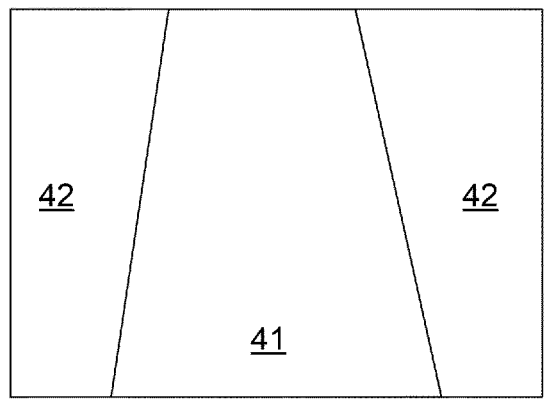
(c)
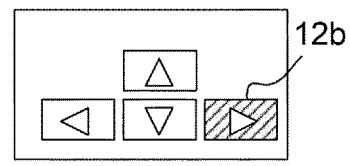
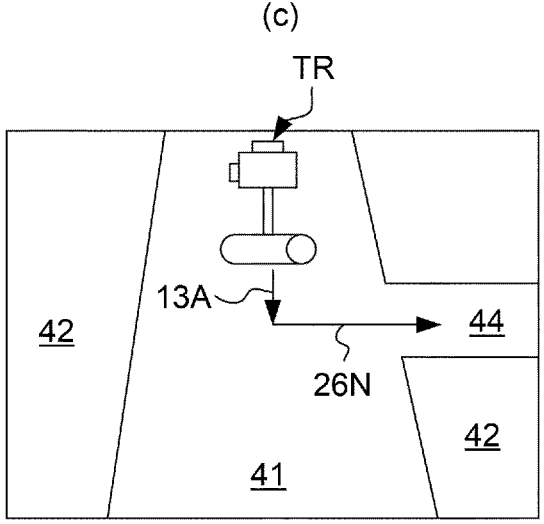

ROBOT AND CONTROL SYSTEM

CROSS-REFERENCE TO RELATED APPLICATIONS

The present application is based on PCT filing PCT/JP2020/008538, filed Feb. 28, 2020, which claims priority to JP 2019-053390, filed Mar. 20, 2019, the entire contents of each are incorporated herein by reference.

TECHNICAL FIELD

The present invention relates to a robot and a control system.

BACKGROUND ART

Robots remotely operated via a network, called telepresence robots, have been already known in the art.

In such robots, the occurrence of a delay associated with the transmission and reception of data is inevitable because of the intervention of a network. When an operator performs remote control, a real-time moving image captured by a robot may differ from a moving image viewed by the operator as a clue to give a movement instruction due to a delay, thus becoming a cause of an incorrect operation.

Robots that automatically operate in accordance with autonomous determination made by the robots have also been known in the art.

Such an autonomous robot, however, does not have much freedom to accept an operation made by an operator, thus detracting the feature of telepresence robots, i.e., "taking action in response to an operator operating the robot on one's own will to any remote place where the operator wants to go".

SUMMARY OF INVENTION

Technical Problem

The present invention has been made in view of the foregoing problems and it is an object of the present invention to provide a robot that can reduce the occurrence of incorrect operations due to a time difference in network while maintaining its operability.

Solution to Problem

According to an aspect of the present invention, a robot is configured to move in accordance with an operation instruction made by an operator via a network. The robot includes a moving image acquisition unit, a receiving unit, a movement destination predicting unit, and an autonomous control unit. The moving image acquisition unit is configured to capture, as a moving image, an environment around the robot. The receiving unit is configured to receive the operation instruction. The movement destination predicting unit is configured to predict a movement destination of the robot based on the operation instruction received by the receiving unit. The autonomous control unit is configured to autonomously correct movement to the movement destination in accordance with the operation instruction, based on information on the environment obtained from a moving image at an instant when the operation instruction is received.

Advantageous Effects of Invention

According to an aspect of the present invention, the occurrence of an incorrect operation due to a time difference in a network can be reduced while maintaining the operability.

BRIEF DESCRIPTION OF DRAWINGS

FIG. 1 is a diagram illustrating an example of a general configuration of a control system in a telepresence robot according to an embodiment of the present invention.

FIG. 2 is a block diagram illustrating an example of a configuration of a movement instructing unit illustrated in FIG. 1.

FIG. 3 is a block diagram illustrating an example of a configuration of the control system illustrated in FIG. 1.

FIG. 4 is a diagram illustrating an example of delay relationship among a network delay, a moving image acquired by the robot, and an operation instruction.

FIG. 5 is a diagram illustrating an example of a case where autonomous control according to the present embodiment is added to the delay relationship illustrated in FIG. 4.

FIG. 6 is a diagram illustrating a first example of an operation of an autonomous control unit according to the present invention.

FIG. 7 is a diagram illustrating an example of control operations of the control system according to the present invention.

FIG. 8 is a diagram illustrating a second example of an operation of the autonomous control unit according to the present invention.

FIG. 9 is a diagram illustrating a third example of an operation of the autonomous control unit according to the present invention.

FIG. 10 is a diagram illustrating a fourth example of an operation of the autonomous control unit according to the present invention.

DESCRIPTION OF EMBODIMENTS

As an example of an embodiment of the present invention, FIG. 1 illustrates a conceptual diagram illustrating a general configuration of a control system 100 in a telepresence robot TR, which is a remote control robot operated via a network 9 by an operator P using an operating unit 10.

The telepresence robot TR includes: a camera 20, which is a moving image acquisition unit; a moving unit 21 configured with wheels or an endless belt so as to be movable; a receiving unit 22 for receiving an operation instruction from the operating unit 10; and a control unit 30 for controlling components of the telepresence robot TR in accordance with the operation instruction received by the receiving unit 22.

The operating unit 10 includes: a moving image display unit 11 for displaying an image or a video viewed by the operator P to perform an operation; and a movement instructing unit 12 including a plurality of buttons to instruct movement directions as illustrated in FIG. 2.

The operating unit 10 transmits and receives data to and from the telepresence robot TR through communications via the wireless or wired network 9.

Specifically, a moving image captured by the telepresence robot TR with the camera 20 is transmitted to the moving image display unit 11, and an operation instruction made by the operator P using the movement instructing unit 12 while viewing the moving image display unit 11 is transmitted to the receiving unit 22 of the telepresence robot TR.

The movement instructing unit 12 has a function as a movement direction instructing unit including, for example, four buttons, i.e., a forward movement instructing button 12a, a right-turn instructing button 12b, a backward movement instructing button 12c, and a left-turn instructing button 12d.

Although the receiving unit 22 is represented separately from the control unit 30 in the present embodiment, the receiving unit 22 may be provided as a single function in the control unit 30 and the present invention is not limited to such a configuration.

As illustrated in FIG. 3, the control unit 30 includes: a movement destination predicting unit 31 for predicting a movement destination of the telepresence robot TR on the basis of the operation instruction received by the receiving unit 22; and an autonomous control unit 32 for autonomously correcting movement to the movement destination in accordance with the operation instruction on the basis of information on the surrounding environment.

The control unit 30 also includes a delay measuring unit 33 for measuring delay time td, which is an amount of time between the instant when a moving image is acquired by the camera 20 and the instant when an operation instruction made by the operator P on the basis of the moving image is received at the receiving unit 22, as will be described later.

On the basis of the operation instruction received from the receiving unit 22, the movement destination predicting unit 31 determines which direction to move (forward, backward, leftward, or rightward), and predicts a tentative movement destination Q as will be described later.

The autonomous control unit 32 controls the movement of the moving unit 21 to the movement destination Q on the basis of the movement destination Q predicted by the movement destination predicting unit 31 and information on the surrounding environment obtained by the camera 20.

The delay measuring unit 33 measures delay time, for example, by transmitting a time-stamped moving image when a moving image frame F1 to be described later is transmitted to the operating unit 10 and measuring a time difference between the time at which the transmission is performed and time at which the time-stamped moving image is received by the operating unit 10. Note that such a way of measuring delay time is given by way of example only. For example, data may be transmitted and received so as to make a round trip over the network 9 and delay time may be measured from an amount of time required for the transmission and reception of the data. Alternatively, any known method capable of measuring delay over a network may be employed.

When such a control system 100 is used, an amount of time required for transmission and reception over the network 9 causes a problem such that a delay corresponding to a moving image transmission and reception time t1 occurs between a moving image frame acquired by the camera 20 and a moving image frame displayed on the moving image display unit 11 after being delayed by the transmission and reception as illustrated in FIG. 4.

Moreover, time at which an operation instruction made by the operator P is received at the receiving unit 22 of the telepresence robot TR is delayed by the delay time td corresponding to the sum of the moving image transmission and reception time t1, an operation determination time t2, which is an amount of time between the instant when the operator P views the moving image and the instant when the operator P actually issues an operation instruction using the movement instructing unit 12, and an operation instruction transmission and reception time t3, which is an amount of time taken for the operation instruction to reach the receiving unit 22 from the operating unit 10.

That is, when the operator P remotely operates the telepresence robot TR, a delay greater than or equal to the delay time td inevitably occurs until the operation instruction is actually received and movement is started after the moving image frame captured by the camera 20 as illustrated in FIG. 4. It is known that a delay of td=approximately 0.3 to 0.4 second occurs when a typical current network 9 is used.

In other words, when the operator P transmits an operation instruction while viewing the frame F1 displayed on the moving image display unit 11 and then the telepresence robot TR actually operates, situations may often differ from a frame F13, acquired by the camera 20, representing the actual surrounding environment. Thus, an operation instruction unsuitable for the surrounding environment of the telepresence robot TR in the frame F13 acquired by the camera 20 may be issued.

It is impossible to make such delay time td zero in remotely operating the telepresence robot TR. In addition, such delay time td can be a cause of an unintended accident or failure in operating the telepresence robot TR, such as overshooting a path to proceed, or colliding with a person or an object when the person or the object suddenly appears on a course as an obstacle.

In order to solve such problems, a method of allowing a robot itself to determine a course without operating the robot can be contemplated. In movement by means of simply programmed autonomous control, however, the operator P cannot operate the robot as desired. Thus, a problem arises in that a task such as remotely patrolling a desired site is difficult to be conducted properly.

In order to solve such a problem, the present invention includes the autonomous control unit 32 for autonomously correcting movement to the movement destination Q in accordance with an operation instruction on the basis of a moving image acquired by the camera 20.

The control unit 30 also includes the delay measuring unit 33 for measuring the delay time td, which is an amount of time between the instant when a moving image is acquired by the camera 20 and the instant when an operation instruction made by the operator P on the basis of the moving image is received at the receiving unit 22, as will be described later.

Operations of such an autonomous control unit 32 will be described in detail with reference to FIGS. 5 to 7.

First, it is assumed that a delay equal to the delay time td illustrated in FIG. 4 occurs before the operator P views a moving image on the moving image display unit 11 and actually issues an operation instruction.

On the basis of a moving image frame (the frame F13, in particular, in FIG. 5) of the camera 20 at a timing when the receiving unit 22 receives an operation instruction A, the autonomous control unit 32 instructs the moving unit 21 about an autonomous operation 13A obtained by correcting the operation instruction A on the basis of the frame F13. Also when operation instructions B to R are received thereafter, for example, autonomous operations 14B to 25M are sequentially executed on the basis of moving image frames (F14 to F25) of the camera 20 at timings when the operation instructions B to R are received as illustrated in FIG. 5.

As compared to when movement is performed by directly following the movement control A made only on the basis of the moving image frame F1, high-precision control, which takes the surrounding environment obtained by the latest moving image frame F13 into consideration, can be achieved by performing the autonomous operation 13A obtained by correcting the operation instruction A, which has been issued on the basis of the moving image frame F1, on the basis of the moving image frame F13.

Moreover, control taking delay time into consideration can be performed as compared to when the movement control A is simply performed since correction is made using the moving image frame acquired after the passage of the delay time td. Note that correction to be made in movement to the movement destination Q may vary depending on the delay time td, for example. Alternatively, if the delay time td can be regarded as a sufficiently small amount, such a correction value can be set to 0, thus allowing the instruction made by the operator P to be directly executed by the telepresence robot TR.

Specifically, operations in the case where the forward movement instructing button 12a (to indicate forward movement) of the movement instructing unit 12 is pressed by the operator P when the moving image frame F1 as illustrated at (a) in FIG. 6 is acquired will be described.

When the camera 20 acquires the moving image frame F1, the telepresence robot TR transmits the moving image frame F1 to the moving image display unit 11 (step S101).

On the basis of the received moving image frame F1, the operator P presses the forward movement instructing button 12a of the movement instructing unit 12 in order to perform an operation to move straight ahead (step S102).

The receiving unit 22 receives such a press of the forward movement instructing button 12a as an operation instruction (step S103).

When such an operation instruction is received at the receiving unit 22, the movement destination predicting unit 31 predicts a direction to which the operator P would want to move the telepresence robot TR in accordance with the button pressed in the movement instructing unit 12 (step S104).

For the moving image frame F13, as illustrated at (b) in FIG. 6, acquired by the camera 20 when the operation instruction is received, the movement destination predicting unit 31 predicts, on the basis of a travelable path 41 set in advance or distinguished, for example, by image recognition, and a region 42 outside the path, which is an untravelable outside area, that the movement destination Q is in a direction corresponding to the front from among directions along the path 41 (step S105).

At this time, although pressed is the forward movement instructing button 12a, the path 41 actually curves gently in a forward left direction as is apparent from (b) in FIG. 6. Thus, the autonomous control unit 32 predicts that movement to the "front", which has been instructed by the forward movement instructing button 12a, is actually movement to the movement destination Q in the "diagonally forward left direction" on the basis of the moving image frame F13.

Furthermore, once the movement destination Q is predicted, the autonomous control unit 32 controls and moves the moving unit 21 to such a movement destination Q via the autonomous operation 13A according to the curvature of the path 41 (step S106).

In this manner, the autonomous control unit 32 performs movement to the movement destination Q by making a correction on the basis of the moving image frame F13 acquired when the receiving unit 22 receives the operation instruction.

In the autonomous operation 13A of the autonomous control unit 32 at this time, it is desirable for the telepresence robot TR to keep moving toward the predicted movement destination Q if the telepresence robot TR receives "no" movement instruction (no button is pressed, or no new operation instruction is issued) (step S107).

If no new operation instruction is issued, it is further determined whether the state in which no operation instruction is issued continues for a predetermined amount of time or longer (step S108).

In the present embodiment, the autonomous control unit 32 continues movement toward the movement destination Q if no operation instruction is received within the predetermined amount of time in the course of moving to the movement destination Q.

In this manner, the telepresence robot TR continues to move toward the movement destination Q obtained the predetermined amount of time earlier even when no movement instruction is received. By continuing such movement even when unintentional disruption of the movement instruction (such as instantaneous interruption of the network 9) occurs, the operation can be continued without any trouble when the network 9 is resumed.

If the operation instruction stops for the predetermined amount of time or longer (Yes in the step S108), the movement of the telepresence robot TR may be discontinued (step S109).

By controlling the telepresence robot TR to stop when no operation instruction is received for the predetermined amount of time or longer as just described, an accident such as a collision can be prevented from occurring when serious disconnection of the network 9 occurs rather than the instantaneous interruption of the network 9.

Furthermore, in order to allow the operator P to recognize a movement direction accurately when movement is performed in accordance with the autonomous operation 13A in the step S106, the movement destination Q and a predicted route, which would be traced by the autonomous operation 13A, may be displayed as indicated by a dash-dot line at (b) in FIG. 6 when the moving image frame F13 is transmitted to the moving image display unit 11.

Displaying the predicted movement direction in this manner allows the operator P to perform an operation while checking if the movement operation made by himself or herself is correctly understood by the telepresence robot TR, thus further contributing to an increase in the accuracy of the operation instruction.

In the present embodiment, the movement destination Q is predicted simply on the basis of being on the path 41. However, a method of selecting any one of a plurality of destination candidates described in map information and defined in advance by connecting indoor/outdoor location measurement information to map information in a remote place, for example, may be employed as a method for predicting the movement destination Q.

Alternatively, learning data, including a "captured moving image" as illustrated at (a) or (b) in FIG. 6, a pressed "movement instruction", and a "location (destination)" to which the operator P actually wants to move as one set, may be collected in advance in the telepresence robot TR, and the autonomous control unit 32 may be caused to learn such data by machine learning.

According to such a machine learning method, in response to inputs of a "movement instruction" and environmental information obtained from a "moving image", the autonomous control unit 32 can output an operation of the moving unit 21, which is thought to be optimum, from among various patterns inputted in the learning data.

In addition to preparing the learning data, environmental learning may be performed using moving image data acquired by the camera 20 as environmental information and operation instructions by actually operating the telepresence robot TR repeatedly.

If a different operation instruction from the operating unit 10 is received at the receiving unit 22 in the step S107, the movement destination predicting unit 31 and the autonomous control unit 32 repeatedly perform the operations from the step S101 through the step S108 in accordance with such an operation instruction. Thus, the telepresence robot TR continues to be operated.

If no new operation instruction is received for the predetermined amount of time or longer, the telepresence robot TR stops as indicated at the step S109.

Examples of a different autonomous operation of such an autonomous control unit 32 are described in FIGS. 8 to 10 together with schematic diagrams of moving images and operation instructions. Note that the autonomous operation 13A in the present embodiment is not limited to such operations, and those are given by way of example only.

FIG. 8 is a schematic diagram illustrating a case where a person 43 is on the path 41 as an obstacle to be circumvented.

If the operator P presses the forward movement instructing button 12a in the moving image frame F13 as illustrated in FIG. 8, the movement destination predicting unit 31 predicts that a region in front of the person 43 in the moving image frame F13 is the movement destination Q. Thus, the telepresence robot TR stops in front of the person 43 even when the forward movement instructing button 12a continues to be pressed.

As just described, by recognizing the person 43 on the basis of the moving image frame F13, which indicates a moving image at the instant when the operation instruction is received, the autonomous control unit 32 stops movement and performs an autonomous operation to avoid a collision with the person 43 if the person 43 is present in the movement direction of the telepresence robot TR.

Such an autonomous operation can be applied also to a case where a stop determination is made when any obstacle, other than the person 43, is present on the path 41.

FIG. 9 is a schematic diagram illustrating a case where a movement direction is unclear since the forward movement instructing button 12a is being pressed.

In the moving image frame F13 as illustrated in FIG. 9, the path 41 is discontinued in the forward direction, and a traveling direction of making either a left turn or a right turn at the end is unclear.

In such a moving image frame F13, the movement destination predicting unit 31 predicts that a region around the top edge of the path 41 is the movement destination Q, and the autonomous control unit 32 instructs the moving unit 21 to move to the movement destination Q and then stop.

As just described, when which way is more preferable to move is unclear, such as a left turn or a right turn at a T-junction, the autonomous control unit 32 causes the telepresence robot TR to move to the movement destination Q and then stop.

In such a case, the autonomous control unit 32 may be configured to display a message saying that an instruction of a left turn or a right turn is required when transmitting the moving image frame F13 to the operator P, wait for the reception of a "movement instruction made by the operator P", and start controlling a left turn or a right turn when the receiving unit 22 receives the movement instruction B.

Also when the operation instruction B is issued, the autonomous control unit 32 delivers, to the moving unit 21, an autonomous operation 26B obtained by referring to a moving image frame F26 acquired by the camera 20 at the instant when the operation instruction B is received at the receiving unit 22.

FIG. 10 is a diagram illustrating an example of autonomous movement control when the telepresence robot TR overshoots a place 44 where a right turn can be made.

FIG. 10 illustrates, at (a), an image of the moving image frame F1. A case in which the operator P detects the place 44 where a right turn can be made while viewing such a moving image frame F1 displayed on the moving image display unit 11 and presses the right-turn instructing button 12b of the movement instructing unit 12 after the telepresence robot TR overshoots the place 44 will be discussed.

As previously mentioned, in the moving image frame F13 at the instant when the right-turn instruction is received at the receiving unit 22, the telepresence robot TR has already overshot the place 44 where a right turn can be made as illustrated at (b) in FIG. 10 due to the delay time td of the network 9.

As of the moving image frame F1 illustrated at (a) in FIG. 10, the autonomous control unit 32 recognizes and stores in advance that there is a place where a right turn can be made on the path 41.

When a right-turn instruction is received at the receiving unit 22, the movement destination predicting unit 31 sets a tentative movement destination Q in a rightward direction as the movement destination Q.

If the autonomous control unit 32 receives a right-turn instruction within the delay time td after the autonomous control unit 32 stores the presence of the place 44 where a right turn can be made, the autonomous control unit 32 then determines that the right-turn instruction indicates a right turn to the place 44 where a right turn can be made and corrects the movement destination Q so as to be set at the place 44 where a right turn can be made.

More specifically, on the basis of the two pieces of environmental information, i.e., the presence of the place where a right turn can be made, and the fact of having overshot the place where a right turn can be made, which is known from the moving image frame F13 illustrated at (b) in FIG. 10, the autonomous control unit 32 corrects the movement destination Q so as to be set at the place 44 where a right turn can be made on the path 41 and then selects the autonomous operation 13A so as to move the telepresence robot TR backward by a distance corresponding to the forward overshoot as illustrated at (c) in FIG. 10. The autonomous control unit 32 also performs autonomous control 26N so as to make a right turn for the right-turn instruction after the completion of the backward movement.

In this manner, the autonomous control unit 32 autonomously corrects movement to the movement destination Q in accordance with an operation instruction on the basis of environmental information obtained from the moving image frame F13.

With such a configuration, the occurrence of incorrect operations due to a time difference in network can be reduced while maintaining operability by the operator P himself or herself.

Although the preferred embodiment of the present invention has been described above, the present invention is not limited to such a particular embodiment. Unless otherwise specified in the foregoing description, various variations and modifications are possible without departing from the spirit of the present invention set forth in the claims.

In the present embodiment, such a robot as including the moving unit 21 driven by wheels or an endless belt has been described as the telepresence robot TR, for example. The present invention, however, may be applied to robots having other driving mechanisms.

The present embodiment has described the case where control by means of machine learning is performed as a method for correcting the movement destination Q by the autonomous control unit 32. However, any method such as simply adding a predetermined correction value for the delay time td may be employed as long as the method makes a correction in consideration of the surrounding environment at the instant when the telepresence robot TR receives a movement instruction at the receiving unit 22.

Although the movement destination predicting unit 31 and the autonomous control unit 32 in the present embodiment have been described as components of the control unit each having a separate function, the present invention is not limited to such a configuration. The autonomous control unit may alternatively have a function to predict a movement destination.

The advantageous effects described in the embodiment of the present invention are merely the enumeration of the most preferred advantageous effects obtained from the present invention. The advantageous effects of the present invention are not limited to those described in the embodiment of the present invention.

REFERENCE SIGNS LIST

10 Operating unit
11 Moving image display unit
12 Movement instructing unit
20 Moving image acquisition unit (Camera)
21 Moving unit
22 Receiving unit
30 Control unit
31 Movement destination predicting unit
32 Autonomous control unit
100 Control system
TR Robot (Telepresence robot)
P Operator
Q Movement destination

CITATION LIST

Patent Literature

PTL 1: Japanese Laid-open Patent Publication No. 2017-102705 A
PTL 2: Japanese Patent No. 5503052

The invention claimed is:

1. A robot, comprising:
    moving image acquisition circuitry configured to capture moving images of an environment around the robot;
    a receiver configured to receive, from an operator via a network, an operation instruction to instruct a movement direction of the robot;
    movement destination predicting circuitry configured to predict a movement destination of the robot based on the operation instruction and a particular moving image, of the moving images, that is acquired when the operation instruction is received; and
    an autonomous controller configured to autonomously correct movement of the robot according to the movement destination.

2. The robot according to claim 1, wherein the movement destination is selectable from among a plurality of candidates given in advance.

3. The robot according to claim 1, further comprising:
    delay measuring circuitry configured to measure a time difference between when the particular moving image is captured and the instant when the operation instruction is received, wherein
    the autonomous controller is configured to change an amount of correction in accordance with the time difference.

4. The robot according to claim 1, wherein the autonomous controller is configured to conduct machine learning based on data sets including the particular moving image, the operation instruction, and the movement destination.

5. The robot according to claim 1, wherein the autonomous controller is configured to continue the movement in a case that the operation instruction is not received for a predetermined amount of time during movement to the movement destination.

6. The robot according to claim 1, wherein the robot is configured to stop in a case that the operation instruction is not received for the predetermined amount of time or longer.

7. The robot according to claim 1, wherein the movement destination predicting circuitry is configured to discriminate, in the moving images, between a path area where the robot can move and an outside area where the robot cannot move.

8. A control system comprising:
    the robot according to claim 1; and
    a display to display the moving images to the operator, wherein
    the moving images are displayed together with a predicted route for the movement corrected by the autonomous controller.

* * * * *